(12) United States Patent
Lipowitz et al.

(10) Patent No.: US 7,574,378 B2
(45) Date of Patent: Aug. 11, 2009

(54) SYSTEM FOR STOCK IMAGES PEER-TO-PEER SERVICES OVER THE WORLD WIDE WEB

(75) Inventors: Shay Lipowitz, Givatayim (IL); Ron Beery, Ramat Gan (IL); Hanan Gelbendorf, Ramat Hasharon (IL); Hanan Weisman, Ra'anana (IL); Raz Manascherov, Rishon Lezion (IL)

(73) Assignee: Kodak IL Ltd., Herzlia (IL)

( * ) Notice: Subject to any disclaimer, the term of this patent is extended or adjusted under 35 U.S.C. 154(b) by 892 days.

(21) Appl. No.: 11/109,758

(22) Filed: Apr. 20, 2005

(65) Prior Publication Data
US 2006/0044599 A1 Mar. 2, 2006

Related U.S. Application Data

(63) Continuation-in-part of application No. PCT/IL03/00674, filed on Aug. 14, 2003, application No. 11/109,758, filed on Apr. 20, 2005.

(60) Provisional application No. 60/426,351, filed on Nov. 15, 2002, provisional application No. 60/564,216, filed on Apr. 22, 2004.

(51) Int. Cl.
*G06Q 30/00* (2006.01)
*G06F 17/30* (2006.01)
(52) U.S. Cl. ............... 705/26; 705/27; 709/219
(58) Field of Classification Search .......... 709/219; 705/26, 27

See application file for complete search history.

(56) References Cited

U.S. PATENT DOCUMENTS

| | | | |
|---|---|---|---|
| 5,327,265 A * | 7/1994 | McDonald | 358/527 |
| 5,873,076 A * | 2/1999 | Barr et al. | 707/3 |
| 6,035,323 A * | 3/2000 | Narayen et al. | 709/201 |
| 6,208,988 B1 * | 3/2001 | Schultz | 707/5 |
| 6,545,687 B2 * | 4/2003 | Scott et al. | 345/629 |

(Continued)

FOREIGN PATENT DOCUMENTS
EP 0 878 956 A 11/1998

(Continued)

OTHER PUBLICATIONS

Martin, J.A., "Hands-on: Photo CD," Macworld, vol. 10, No. 7, pp. 92-97, Jul. 1993.*

(Continued)

*Primary Examiner*—Nicholas D Rosen
(74) *Attorney, Agent, or Firm*—Nelson A. Blish

(57) ABSTRACT

A system for distributed digital images. The system comprises image publishers, image buyers, and a system service center. Image publishers, interested in selling rights in high-resolution images, publish thumbnails representing those images in the service's web-site. The image buyer, searching the service web site for images of particular attributes, selects those thumbnails meeting her/his requirements, and gets from the service a temporary direct communication link to the image repository of the image publisher. The buyer gets the option to remotely review, enhance and embed, in a page layout, the low-resolution representation of the selected thumbnails, and quality check parts of the high-resolution images. The buyer negotiates a price with the image publisher, and pays via the service's billing module. On conclusion the buyer acquires the high-resolution image file directly from the publisher's repository.

11 Claims, 15 Drawing Sheets

U.S. PATENT DOCUMENTS

| | | | |
|---|---|---|---|
| 6,757,684 B2* | 6/2004 | Svendsen et al. | 707/10 |
| 2002/0019743 A1* | 2/2002 | Nakamura | 705/1 |
| 2002/0057454 A1* | 5/2002 | Ueda et al. | 358/1.15 |
| 2002/0112001 A1* | 8/2002 | Sutherland et al. | 709/203 |
| 2003/0063770 A1* | 4/2003 | Svendsen et al. | 382/100 |
| 2003/0161499 A1* | 8/2003 | Svendsen et al. | 382/102 |
| 2004/0015479 A1* | 1/2004 | Meek et al. | 707/1 |
| 2005/0147442 A1* | 7/2005 | Walker et al. | 400/76 |

FOREIGN PATENT DOCUMENTS

| | | |
|---|---|---|
| EP | 0 982 668 A | 3/2000 |
| EP | 1 139 244 A | 10/2001 |
| EP | 1 139 256 A | 10/2001 |
| EP | 1 158 461 A | 11/2001 |
| WO | WO 01 41018 A | 6/2001 |
| WO | WO 2004/046982 A | 6/2004 |

OTHER PUBLICATIONS

Holusha, J., "Photo Library at a Few Clicks of the Keyboard, A," New York Times, Final Edition, p. 5, col. 3, Oct. 30, 1995.*

Laurie, J., "Web Offers Natural Resources for Publishers," Folio: The Magazine for Magazine Management, vol. 24, No. 21, p. 55, Dec. 15, 1995.*

Sherman, E., "Solutions: PhotoDisc Reins in Disparate Assets," MacWeek, vol. 12, No. 11, p. 23, Mar. 16, 1998.*

International Search Report from International Application No. PCT/IL/03/00674.

European Search Report for EP Application No. 05 25 2534.

* cited by examiner

SYSTEM FOR STOCK IMAGES PEER-TO-PEER SERVICES OVER THE WORLD WIDE WEB

The present application is a Continuation-In-Part application of International Patent Application PCT/IL03/00674, filed 14 Aug. 2003, published as publication No. WO 2004/046982 on Jun. 3, 2004 and claims priority from U.S. provisional application 60/426,351, filed Nov. 15, 2002. The present application further claims benefit of U.S. provisional application 60/564,216, filed 22 Apr. 2004.

FIELD AND BACKGROUND OF THE INVENTION

The invention relates to the acquisition of digital stock images used in the graphic arts industry over Peer-to-Peer networks In particular, obtaining selected digital stock images directly from their originators, using the Internet services.

GLOSSARY

The following terms are defined in the web site:
http colon slash slash www dot webopedia dot com slash
Color Matching—The process of assuring that a color on one medium remains the same when converted to another medium. This is extremely difficult because different media use different color models. Color monitors, for example, use the RGB model, whereas process printing uses the CMYK model.

Metadata—Data about data. Metadata describes how and when and by whom a particular set of data was collected, and how the data is formatted.

IP Address—An identifier for a computer or device on a TCP/IP network.

Web-server—A computer that delivers (serves up) Web pages. Every Web server has a fixed IP address and possibly a domain name Peer-to-Peer network—A type of network in which each workstation has equivalent capabilities and responsibilities. In particular, each workstation has a temporary IP address through which it communicates.

The following terms were taken from:
http colon slash slash graphicssoft dot about dot com slash library slash glossary slash bldefresolution dot htm Thumbnail (or Icon)—a "Thumbnail " is a small graphic image that is usually used as a link to either a larger version of that image or to another web site. The image used for the Thumbnail needs to be reduced and resized to a smaller graphic for a quicker download of your web page. The viewer then has the option to click on the Thumbnail if they want to see the larger picture, which will take longer to download, or if they want to visit another site that it is linked to.

Resolution—resolution is a measurement of the output quality of an image, usually in terms of samples, pixels, dots, or lines per inch. The terminology varies according to the intended output device. PPI (pixels per inch) refers to screen resolution, DPI (dots per inch) refers to print resolution, SPI (samples per inch) refers to scanning resolution, and LPI (lines per inch) refers to halftone resolution. Often images are referred to as high-resolution (hi-res) or low-resolution (low-res). High-resolution refers to an image intended for print, generally having 300 samples per inch or more. Low-resolution refers to images only intended for screen display, generally having 100 pixels per inch or less.

We have broadened the above definition:
Low-res Image—is a graphic image that is scaled down for various purposes; preview in an imaging application, hi-res representation for page layout applications or hi-res representation for web usages It has 2 main forms:
1. An image scaled down to a fixed resolution, typically 72 or 144 dpi
2. An image scaled down to a specific screen size typically 600×800 or 768×1024.

Hi-res Image—a graphic image in a digital form that contains all the necessary data for its final use; appropriate resolution, color depth and input profile (color model), i.e. if additional transformations are required in order to convert the image to its final output form, then all necessary input for these transformation is stored within the image, The following terms are defined for the purpose of this application (note FIG. 9):

Link (FIG. 9A)—at least two entities (for example site A and site B) connected (communication wise) by the Internet 50 or other communication link.

Action—an operation (e.g. searching data, transferring data, purchasing goods, paying for merchandise) executed via a link Actions will be symbolized by numbers next to the specific link, for example "search 95".

Entity (FIG. 9B)—an entity (for example: Image Bank) includes one or more operational units (for example: a PC, storage device) The interconnections and mode of operation of the entity are known in the art.

Peer to Peer Link (FIG. 9C)—An Internet 50 or other communication link connection between two or more Peers. Note also: Peer-to-Peer network.

Color transformation—Transforming a color image from one color space (of one device) to another color space (of another device).

ICC—The "International Color Consortium" was established in 1993 by eight industry vendors for the purpose of creating, promoting and encouraging the standardization and evolution of an open, vendor-neutral, cross-platform color management system architecture and components, ICC Profile—Is a color characteristic file, which has information necessary to convert color data between native device color spaces and device independent color spaces.

Input Profile—An ICC profile representing input devices such as scanners and digital cameras.

Output Profile—An ICC profile representing output devices such as printers.

Display Profile—An ICC profile representing display devices such as monitors.

SWOP—"Specifications for Web Offset Publications" Established by the SWOP Committee, a group whose aim is to make consistent the reproduction of advertising materials inserted in a variety of roll-printed publications.

Color Space—An n-dimensional space or model into which the n attributes of a color can be represented, plotted or recorded.

RGB Color Space—A three-dimensional native device color space with the attributes of Red, Green & Blue.

RGB Working space—is a RGB color space, which is defined by an ICC device dependent profile, usually Display Profile. However, it does not represent any specific device. This color space is convenient and useful in representing images (also untagged images) while they are displayed and edited by human operators.

CMYK Color Space—A four-dimensional native device color space with the attributes of Cyan, Magenta, Yellow, Key (black).

PCS—"profile connection space"—An abstract color space used to connect the source and destination ICC profiles.

CIE-Lab Color Space—A three-dimensional device independent color space. The L-value represents the lightness/darkness value, the a-value represents the red-green attribute value and the b-value represents the yellow-blue attribute value. CIE-Lab is normally used as a PCS.

Soft proof—The process of using the computer monitor to accurately simulate what the image will look like when printed; proofing on screen, rather than with a hard-copy contract proof.

Output Simulation—is a feature in color management software that allows you to accurately simulate on a monitor display what you will get on the printed page (soft proofing).

Internet Protocol (IP)—pronounced as two separate letters. IP specifies the format of packets (also called datagrams), and the addressing scheme. Most networks combine IP with a higher-level protocol called Transmission Control Protocol (TCP), which establishes a virtual connection between a destination and a source. IP by itself is something like the postal system. It allows you to address a package and drop it in the system, but there's no direct link between you and the recipient. TCP/IP, on the other hand, establishes a connection between two hosts so that they can send messages back and forth for a period of time.

Secure Sockets Layer (SSL)—A protocol developed by Netscape for transmitting private documents via the Internet. SSL works by using a private key to encrypt data that's transferred over the SSL connection Both Netscape Navigator and Internet Explorer support SSL, and many Web sites use the protocol to obtain confidential user information, such as credit card numbers. By convention, URLs that require an SSL connection start with https: instead of http:

Web Services—A "service" is a network-enabled component. Like components, services in general (and Web Services in particular) represent a functionality that can be easily reused without knowing the details of how the service is implemented. Since Web protocols are completely independent across vendor, platform, and language implementations, the result is an application that integrates well with the rest of the enterprise while being flexible enough to modify, as business needs change.

Application Program Interface (API)—A set of routines, protocols, and tools for building software applications.

BACKGROUND

Digital stock images are widely used over the Internet. A common use of these images in the Graphics Arts industry is described below:

Designers, who design a page, look for a specific image to be inserted in that page layout. This image can be specially originated for this occasion or can be searched for in repositories for stock images. These repositories, often called Image Banks, are widely used over the World Wide Web, for example, Getty Images of Seattle, Wash. The designer who looks for an image in an Image Bank can view a small representation of the image If the designer is pleased with this image, he or she negotiates with the Image Bank the price of the full-resolution image. The price depends at least on two factors: the image attributes (how rare, how artistic, whether a celebrity, etc.) and the use of the image in the print (size, media type, media circulation, etc.).

The Image Bank service poses several problems:

In most cases the stock images for use, reside within an Image Bank. Each image requires a large storage capacity, for example: a printed A4 color image in 300 dpi resolution requires about 35 Megabytes of storage Therefore, such a bank needs to allocate many resources in order to store all these images (hardware, disk space, bandwidth) Thus, the price of the stock images for the consumers must be increased.

Stock images are captured or digitized into the RGB color space and are transferred in this format to the users, but images are normally printed after conversion to the CMYK color space, (that is, the preparation for print is performed after the transaction was done) In many cases, the color match between the original image and the printed image is very poor.

Since the mediators (Image Banks) take a significant commission, the image originators get a small portion of the revenue for each image. Moreover, in many cases they do not get the publicity they may have gotten if they sold the images directly Presently, most of the stock image trading is performed via Image Banks. FIG. 1 shows a typical layout and workflow of the current trading mode of stock images.

An Image Bank 10 purchases 11 the original media of an image, e.g. film, from an Image Supplier 20. The Image Bank 10 then scans the film in-house, stores it in an Image Repository 30, and posts its low-resolution representation on the Image Bank's web server 12 which is located on the Internet (50). Once an Image Consumer 40 is interested in stock images, he or she performs a search 14 in the Image Bank 10 web site. Upon location of an appropriate (low-resolution) image, the Image Consumer 40 initiates a purchasing transaction of the high-resolution image. The Image Bank's Management Unit 17 concludes a transaction and up loads the image from the Image Repository 30, and transfers 15 it via the Internet 50 to the Image Consumer 40.

The main problems with this model are: the Image Consumer 40 pays more than necessary, the Image Supplier 20 does not get her/his fair share in the transaction, the images are not ready for print, and finally the images selected from the web-site are not in full-resolution and therefore the Image Consumer cannot evaluate the image quality before the transaction There are other means of stock image trading that are in use. For example, tools that enable the Image Supplier to publish her/his images directly on the Web.

FIG. 2 shows this model of stock image trade, having the following typical workflow: The Image Supplier 20 (e.g. the Impressionist or Modern Art section of a museum), puts its images on the Image Repository 19 of the Stock Image Publisher 60 (e.g. the museum) and then publishes them on the museum's web server 16 and the Web 50, using an Image Publishing Software tool 70, for example, FotoWeb by FotoWare of Norway. Once an Image Consumer 40 is interested in a (e.g. art) stock image, she/he performs a search 22 on the Web 50, using any standard search engine, e.g. Google. The Stock Images Publisher 60, is found in this search and the Image Consumer 40 can perform a particular search, negotiate price and retrieve 23 a specific image from the Stock Images Publisher 60 via the Web 50.

The main drawbacks of this model are: the Image Consumer 40 needs to perform a double search, first a search for one or more Stock Images Publisher 60, and a second search for the specific image within the Stock Images Publisher's website. The Stock Images Publisher has a relatively small repository 19 of images and thus the consumer has fewer images to choose from.

SUMMARY OF THE PRESENT INVENTION

Embodiments of this invention provide a system and method for trading of digital content, particularly graphic arts images, between image publishers, image buyers and a control and coordination service, all communicating via the Internet or other communication means According to one aspect of the invention, there is provided a distributed trading system comprising of image publishers, each having a repository for high-resolution images and an image publishing module, image buyers, a system service unit having an image attributes database, a search module, a billing module and a coordination and control unit and an image enhancement unit. The image publishers, image buyers, enhancement unit and the service unit communicate preferably via the Internet or by means of other communication methods, including physical transfer of films and CD's.

In preferred embodiments of the invention described below, the image publishing module comprises of an image metadata publishing module, an image high-resolution exporting module, a first module of the image enhancement unit and an image price negotiating module, each including further functional units serving the purpose of the system. This image publishing module is downloaded from the service unit to the image publisher upon the first registration of images by the publisher in the service A second module of the image enhancement unit is part of the service unit.

In the preferred embodiment of the invention described below the image enhancement unit includes tools for exporting low-resolution and high-resolution images, in partial or full format, from the image publisher repository; tools for evaluating, enhancing, quality checking, simulating and performing selected layout functions. These tools are functional for assisting the image buyer to conclude the purchase of a specific high-resolution image, initially presented by the service unit as a thumbnail. The evaluation, enhancing and simulation functions are operated from the buyer's computer over the network on the selected file residing in the publisher's repository.

In an alternative embodiment the system service unit includes also an image repository, enabling a different method of operation.

In another alternative embodiment of the invention the enhancement unit is downloaded from the service unit to the image buyer upon the first registration in the service. The evaluation, enhancing and simulation functions are operated from the buyer's computer over the network on the selected file residing in the publisher's repository.

The preferred method of operation described in this invention for the direct purchase of high-resolution images by an image buyer from a specific image publisher comprises: accessing by the buyer the system service unit and searching for the required image by defining desired attributes. Upon location by the service of the attributes in its attributes database, a thumbnail is presented to the image buyer in the service's web-site. A multitude of such thumbnails are pre registered by one or more image publishers in the service with their respective attributes. At the request of the image buyer, a temporary peer-to-peer network connection is established between the buyer and image publisher, and the buyer gets direct access to the low-resolution image file as well as to selected parts of the high-resolution image file. The buyer has now the opportunity to verify, enhance and embed in a page layout, the low-resolution image of each selected thumbnail, quality check selected parts of each respective high-resolution image file and create color simulations. Upon satisfactory completion of the enhancement and quality checks the buyer can purchase the high-resolution image, by negotiating directly with the image supplier the terms of purchase and mode of payment. The payment is done via the billing system of the system's service unit, which can split the payment between eligible parties. The high-resolution image file is consequently transferred from the supplier's repository to the buyer, by means of network downloading, physical transfer of a removable storage media or a transparency. The high-resolution image file is automatically rendered by the enhancement unit to be ready for print, based on the enhancement and quality factors performed at an earlier stage In another preferred embodiment the attribute database can be segmented according to known preference of buyers, such as saturated colors, skin tone or ultra high-resolution. These preference factors entail specific conversion of the low-resolution and high-resolution files representing the image.

In another preferred embodiment the invention an image publisher can be defined as an Exclusive Content Provider.

Certain tools described in this invention are applicable both in the preferred embodiments of the peer-to-peer system or in the prior-art image bank trading method.

BRIEF DESCRIPTION OF THE DRAWINGS

The invention is herein described, by way of example only, with reference to the accompanying drawings, wherein.

DESCRIPTION OF EMBODIMENTS OF THE PRESENT INVENTION

First Preferred Embodiment

Figure 1:
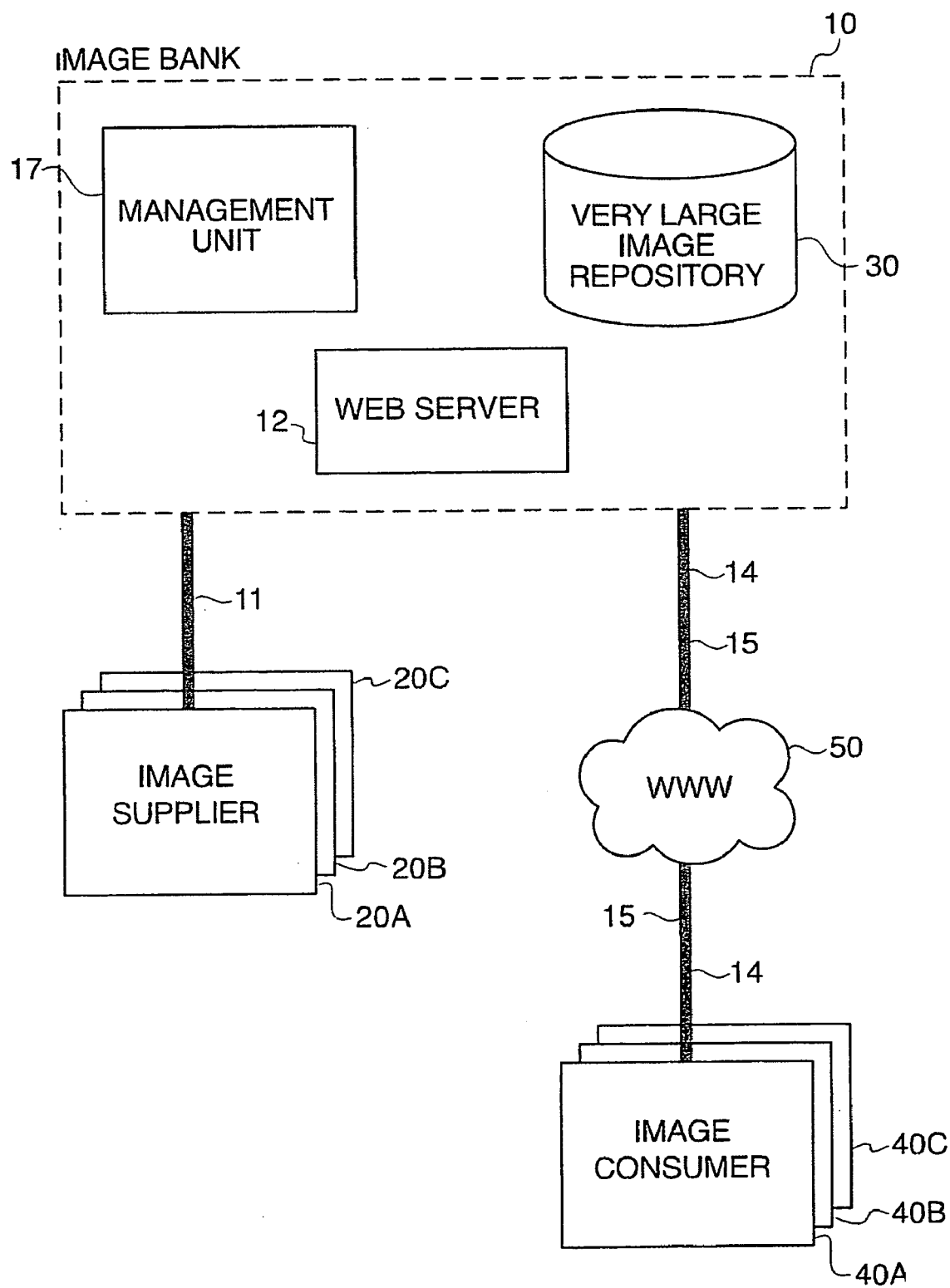
FIG. 1 is a schematic drawing of a typical layout and workflow of the Image Bank trading mode of stock images.
Figure 2:
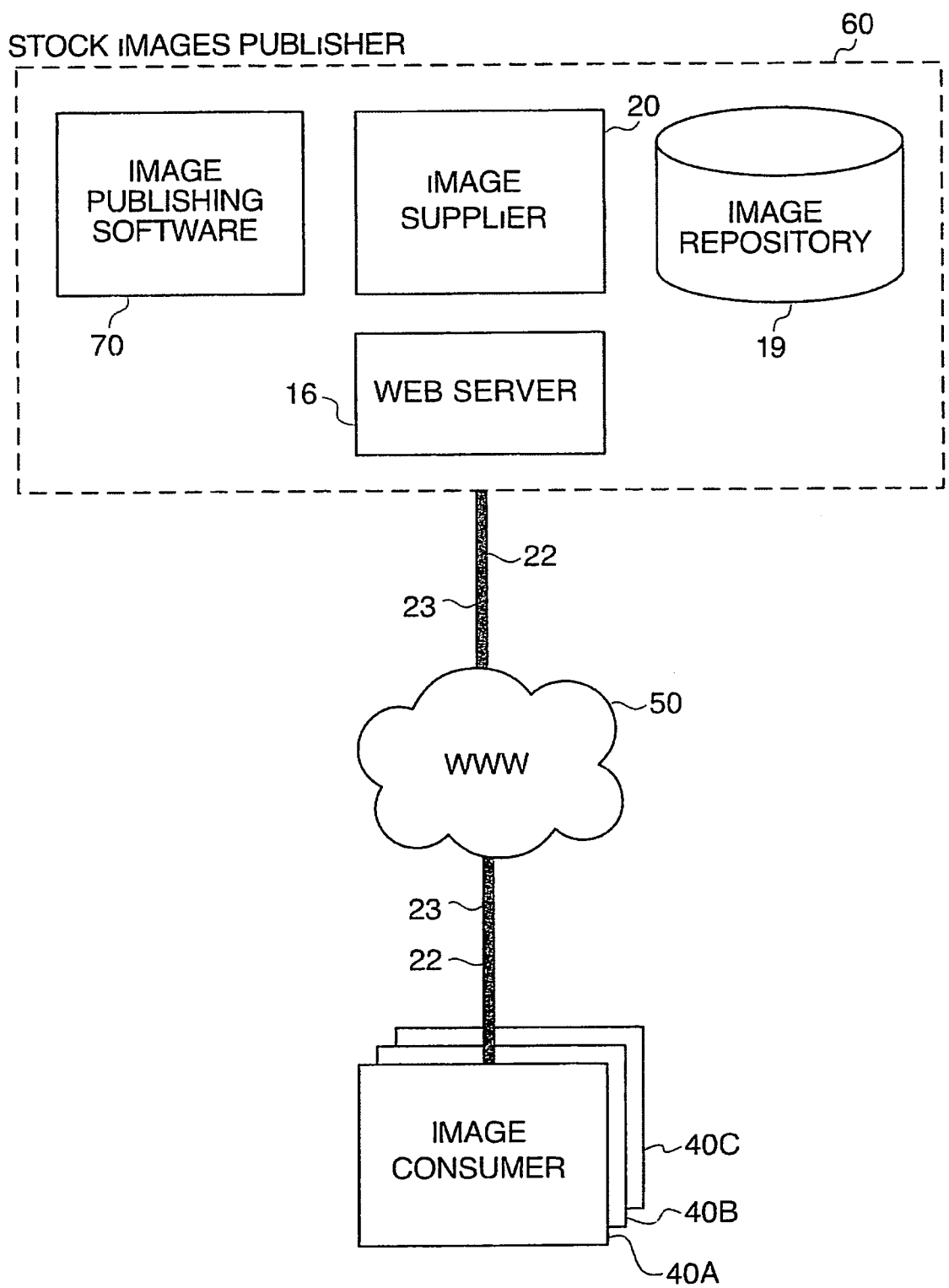
FIG. 2 is a schematic drawing of a typical layout and workflow of the Stock Images Publisher trading mode of stock images.
Figure 3:
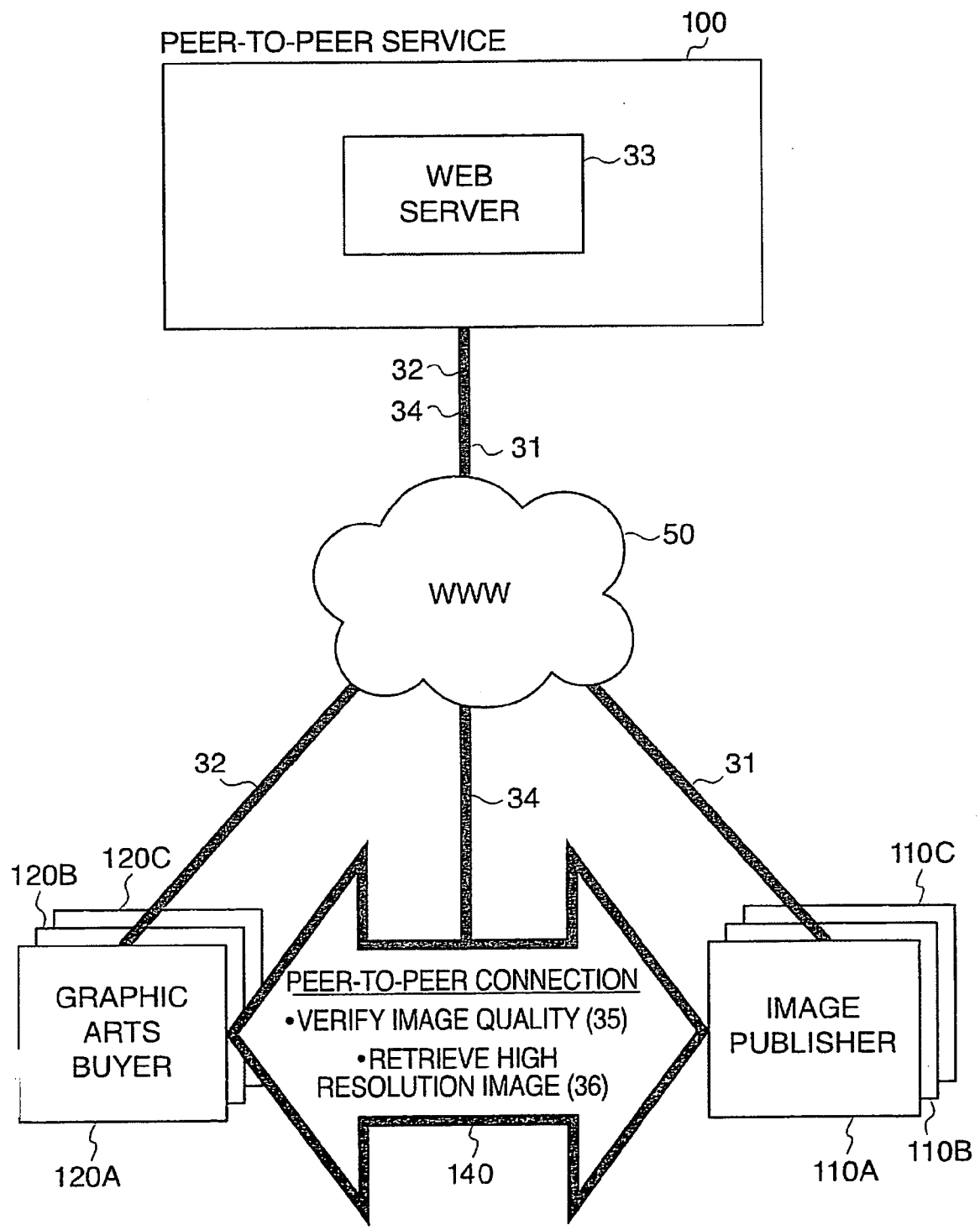
FIG. 3 is a schematic drawing of a typical layout and inter-unit workflow of the Peer-to Peer operation mode as described in this invention.
Figure 6:
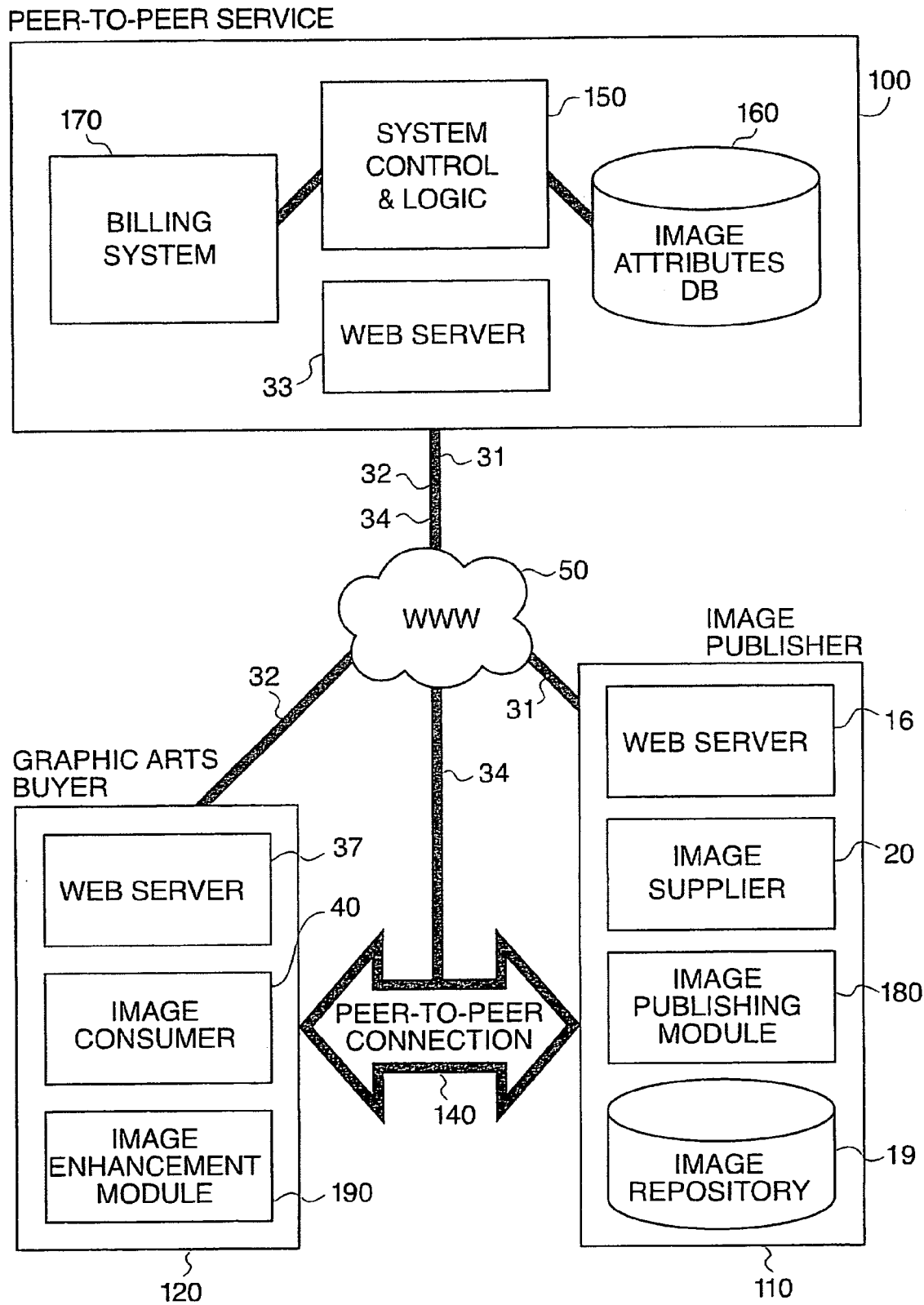
FIG. 6 is a schematic drawing of a typical layout and inter-unit workflow of the Peer-to-Peer Service unit, Image Publisher unit and Graphic Arts buyer unit of FIG. 3.

The invented Peer-to-Peer system, as schematically described in FIG. 3 and detailed in FIG. 6, solves most of the above mentioned problems existing in the present known solutions while offering new features, which are of prime importance to the Graphic arts Buyer.

The Peer-to-Peer service 100 is a hub type unit located on a web-server 33, connected to the Internet 50, having adequate bandwidth for up-loading and down-loading of metadata and Thumbnail images.

Image Publishers 110 (for example a museum) incorporate Image Suppliers 20 (for example, the museum's different departments), an image repository and additional software modules to be further explained later. The Image Publishers 110 own rights in proprietary hi-resolution images, which are registered as Thumbnails by action link 31 and published in the Peer-to-Peer service 100.

Graphic Arts Buyers 120 (for example, studios, ad-agencies, magazines) employ one or more Image Consumers 40 (for example designers) working for the same Buyer, equipped with additional software module to be further explained later. Graphic Arts Buyers 120 looking for stock images for their designs perform a search 32 for such images in the Peer-to-Peer service 100 web site. If, for example, Graphic Arts Buyer 120c finds a Thumbnail that meets her/his requirements, and which belongs to a certain Image Publisher 110b, an option is secured to buy rights in the chosen image and the Peer-to-Peer service 100 establishes 34 an ad-hoc Peer-to-Peer network connection 140 between the Image Publisher 110b and the Graphic Arts Buyer 120c. It assumed here that the ad-hoc network connection is physically feasible, the transmission quality is acceptable (including data transfer rate) and the security level is adequate.

The chosen hi-resolution image is transferred 36 via this connection to the Buyer, following Buyer's image quality verification 35 of the low-res and partial hi-res image and a payment procedure.

The communication means between Graphic Arts Buyers 120, Image Publishers 110 and the Peer-to-Peer service 100 can be other than the Internet, for example Intranet, and combinations of Internet, Intranet, phone and mail services for delivery of CDs or film, including, for example, the high-resolution file of the image.

The invented method and system components will be further explained now in detail.

Figure 4:
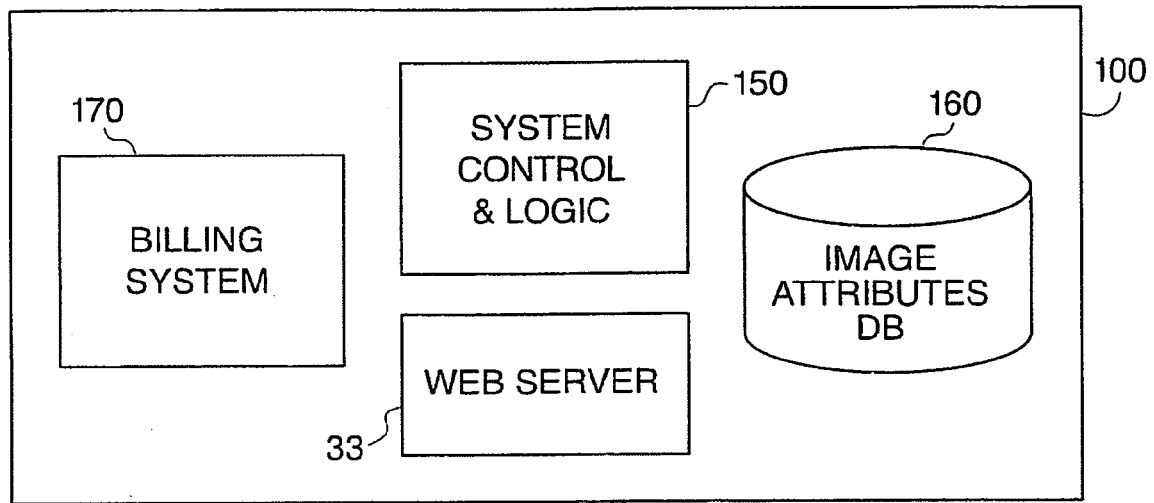
FIG. 4 is a schematic drawing of a typical layout and inter-unit workflow of the Peer-to-Peer Service unit and the Image Publisher unit of FIG. 3.
Figure 4:
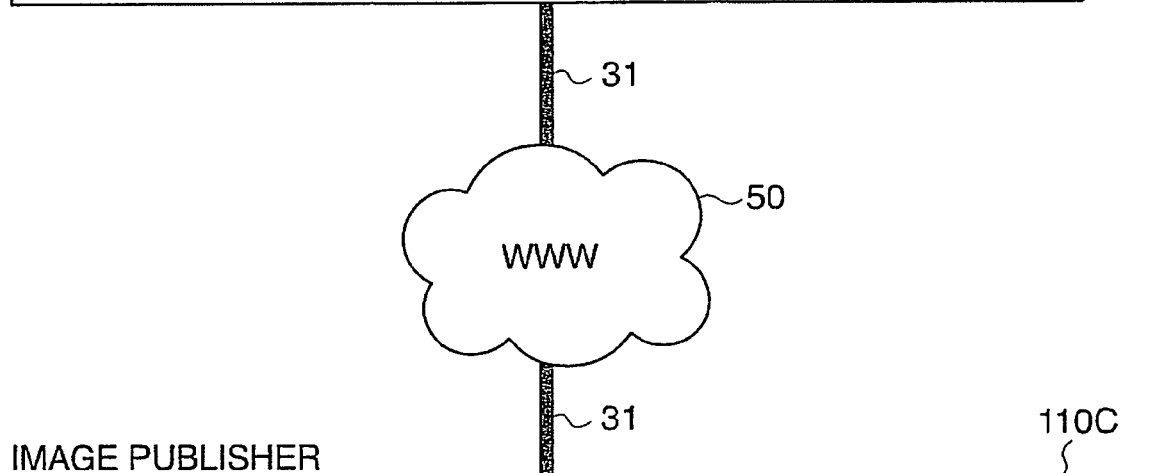
Figure 4:
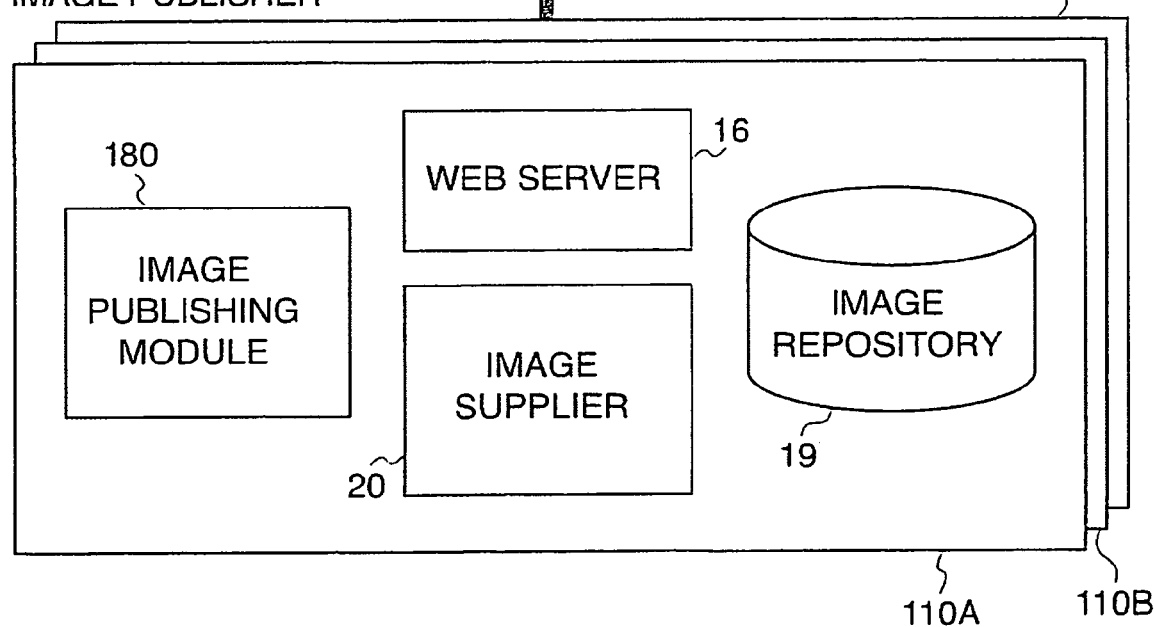

FIG. 4 is a schematic drawing of a typical layout and inter-unit workflow of the Peer-to-Peer Service unit 100 and the Image Publisher unit 110 of FIG. 3.

The Peer-to-Peer service 100 comprises of 4 major units:

1. System Control & Logic unit 150, which can be a known in the art software component running on a computer server, controlling and executing all the networking as well as other system operations.
2. Image Attributes DB 160—stores, in a known in the art data storage device, the following data.
    a. Attributes of the images including, for example, pointers (on the Web) to the hi-resolution images, Thumbnails of hi-resolution images, price information and other metadata.
    b. A list of Image Publishers 110 and their respective Internet addresses.
    c. A list of Graphic Arts Buyers 120.
3. Billing System 170, which provides the billing mechanism for the stock image transactions. This system can be based on existing networked billing systems such as, for example, PayPal (eBay) from Mountain View, Calif. or Payflow Pro of Verisign from California.
4. Web Server 33 linking the Service to the Web 50.

Image Publishers 110, having proprietary images in their own Repository 19, and who wish to sell rights in those images, register 31 these images by uploading the image Thumbnails into the Peer-o-Peer system. For each Thumbnail a form is submitted describing the image metadata, including, for example, physical attributes, content category, textual description of the content and pricing tables.

The System Control & Logic unit 150 performs at least 3 operations:

1. Records the image attributes in the Image Attributes DB 160.
2. Records the Image Publisher's 110 network details into the image attributes DB 160.
3. Records the Image Publisher's 110 necessary account details into the Billing System 170.

If the Image Publisher 110 is a new user of the system, the Image Publisher downloads the Image Publishing Module 180 into its own computer system (not shown). The function of the Image Publishing Module will be further explained later.

Figure 5:
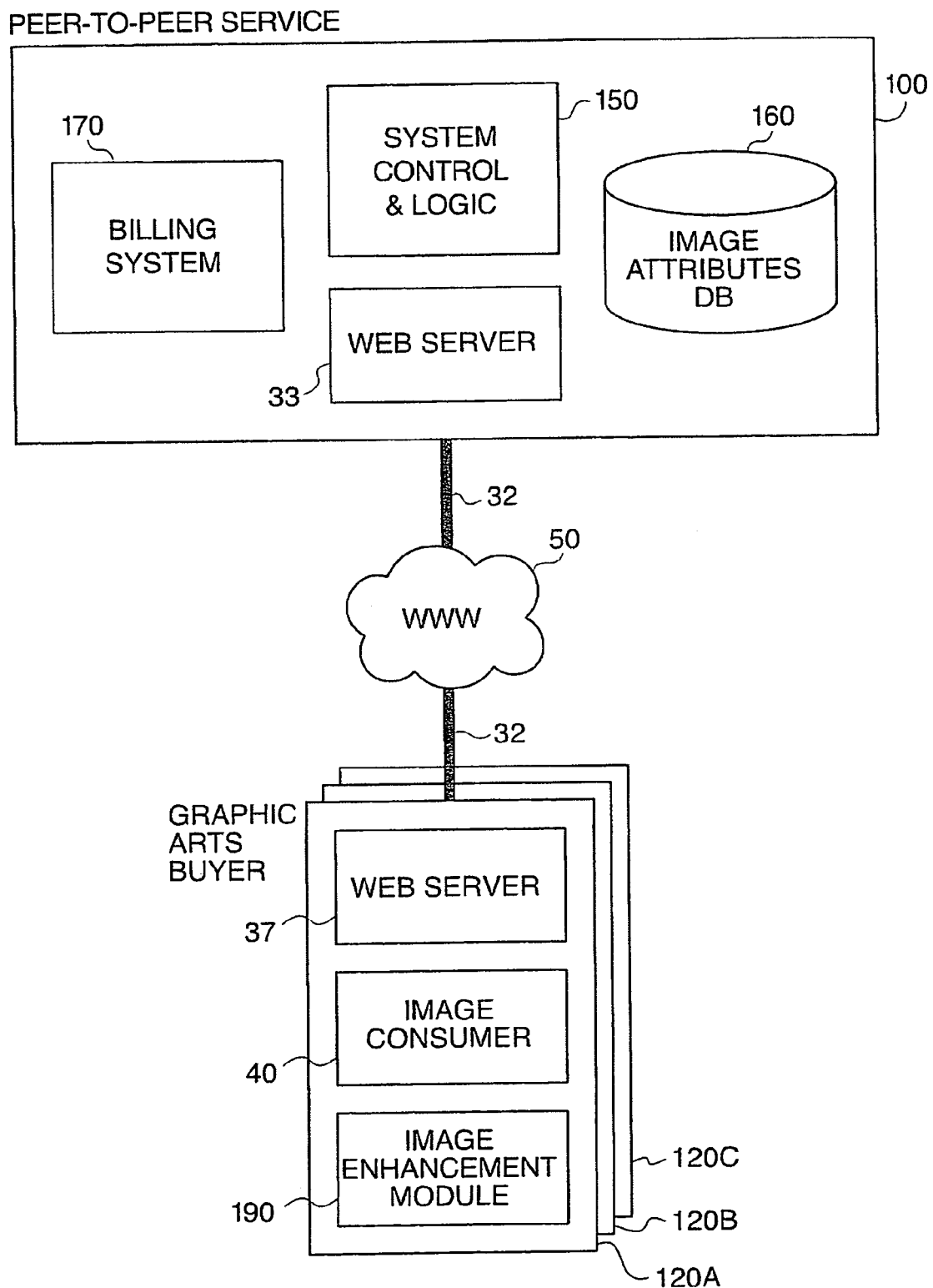
FIG. 5 is a schematic drawing of a typical layout and inter-unit workflow of the Peer-to-Peer Service unit and the Image Buyer of FIG. 3.

FIG. 5 is a schematic drawing of a typical layout and inter-unit workflow of the Peer-to-Peer Service unit and the Graphic Arts Buyer 120, which explains how an Image Consumer 40 finds a particular stock image in the system.

Image Consumer 40, who looks for particular images, searches 32 for such images in the Peer-to-Peer Service's web site 33, which prompts the System Control & Logic unit 150 to look in the Image Attributes DB 160 for the particular image, according to search properties entered by the Image Consumer 40. If such image/s are located, the Service 100 displays the respective Thumbnails to Image Consumer 40. If one or more of the Thumbnails are acceptable to the Consumer, a purchase option is opened, and the Service 100 establishes an ad-hoc peer-to-peer connection between the Image Buyer 120 and the Image Publisher 110 (as explained later in FIG. 6) for the purpose of closer examination of the corresponding low-res files and quality evaluation of parts of the hi-res files. Upon successful conclusion of the procedure, to be further explained in FIG. 7, the transaction is concluded and the hi-res files are transferred to the Consumer.

If the Graphic Arts Buyer 120 is a new User of the system, the Image Consumer 40 downloads the Image Enhancement Module 190 into its own computer system (not shown). The function of the Image Enhancement Module will be further explained later.

For best understanding the typical Peer-to Peer system's workflow, to be further explained in FIG. 7, some additional features and capabilities of specific modules will be discussed in FIG. 6, which is a schematic drawing of a typical layout and inter-unit workflow of the Peer-to-Peer Service unit, Image Publisher units and Graphic Arts Buyer units operating as a coherent system.

1. The Peer to Peer Service unit (100) offers several additional functions:

Grading of images by the Graphic Arts Buyers (120), for example: image quality, communication quality, and the service quality.

Grading of images by the System Control & Logic unit 150, for example: image quality as evaluated by an expert, and/or by scientific tools; statistical and objective evaluation of the communication quality, and statistics on availability of images.

Segmentation of the images in terms of preference of colors (for example, Japanese Consumers prefer saturated colors and specific skin tones). Another segmentation factor is the output resolution needed by the image Consumer 40, for example: Consumer 40 prefers to output on wide-format printers, thus requiring ultra high-resolution images, This segmentation is recorded in the Attributes DB160, and will eventually effect the low-resolution representation examined by the Consumer, as well as the resulting high-resolution file transferred from the Publisher to the Consumer.

2. The Billing System 170 includes, beyond the known in the art payment processing tools and transaction detail logging, the mechanism to split on-line payments by the Buyer 120 to the different eligible parties (for example: the image Publisher 110 and the service 100).

3. The Publisher's Image Repository 19 usually stores the low-resolution image of each proprietary image offered for sale, and one or more high-resolution files (for example having different resolutions).

4. The Image Publishing Module 180, is primarily responsible for the task of exporting the low-resolution and high-resolution image (or specific parts thereof) from the Publisher's repository 19 to the Buyer's Enhancement Module 190, using the ad-hoc peer-to peer link 140, but offers several additional functions:

Scaling the image according to the Buyer's parameters, by known-in-the-graphics-arts methods.

Cropping, by known-in-the-graphics-arts methods, the high-resolution image and transferring over the network connection 140 only the relevant parts of the image.

Embossing or removing, by known in the art methods, an "Electronic Signature" or Watermark" to the images for copyright protection purposes.

Compressing the original file using known-in-the-art methods for loss-less compression.

Embedding metadata into the image file.

5. The Image Enhancement Module 190, is primarily responsible for the task of importing the low-resolution and high-resolution image (or specific parts thereof) from the Image Publishing Module 180, using the ad-hoc peer-to peer link 140, but offers several additional functions:

a) Enhancement and preparation of the image, for inclusion in the designed page; this is performed on the low-resolution representation of the image This function includes, for example, known in the art tools for scaling and cropping the image. The same functions will be subsequently carried out, as further explained later, by the Publishing unit 180 on the hi-resolution image file, before delivery to the Consumer The enhancement function includes other known in the art tools such as, for example, toning, sharpening, color correction and color conversion. These tools help to prepare the image printing on a specific printer. The resulting enhancement details of the low-resolution image will, in case the transaction is completed, be automatically performed, as further explained later, by the Image Enhancement unit 190 on the delivered high-resolution file.

b) Embedding the elected and enhanced low-resolution image/s in the layout of the job at hand without having the ready to print hi-res image. The resulting embedding details of the low-resolution image/s will, in case the transaction is completed, be automatically performed (by the Image Enhancement unit 190) on the delivered raw high-resolution file/s, e.g. toning and color conversion. A similar DTI Workflow automatic feature was published on the Creo website <http://www.creo.com/global/products/scanning_systems/color_scanners/scanner_applications_accessories/oXYgen_digital_transparency/default.htm> c) Image quality verification, an essential phase in the entire workflow. The verification phase consists of 2 main operations:

Maximum details: viewing high-resolution chosen parts of the image.

Output simulation: viewing the image as if processed on the target output device (e.g. proofer, printer).

These two functions are further described hereby:

Maximum Details Function

Every professional graphic arts application (for example: oXYgen by Creo IL Ltd. Herzelia, Israel) enables the user to view parts of a high-resolution image on the screen. The main difference here is that in this invention the operation is carried out over the network, a technology facilitated by, for example, Synapse Insite, another of Creo's applications.

Output Simulation Function

This functionality enables a user to view an image as if it was printed on a specific output device. In particular, applications such as Creo's oXYgen, can simulate, for example, a RGB image (on a calibrated RGB monitor) as if was printed on a specific CMYK printer. This is achieved by using the appropriate ICC profiles in a proprietary color transformation method included in oXYgen The same function will be subsequently carried out, as explained above, by the Image Enhancement unit 190 on the full hi-resolution image file, before delivery to the Consumer.

FIG. 7 is a block diagram of a typical operational workflow of the Peer-to-Peer system, schematically shown in FIG. 6, following the main steps of a transaction between the Image Publisher 110 and the Graphic Arts Buyer 120, who wishes to purchase a stock image from that Publisher.

In FIG. 7 numbers in parenthesis (XXX) stand for the corresponding related entity described in the task.

It is further assumed that one or more Image Publishers 110 have registered their proprietary images with the Peer-to-Peer Service 100, as explained above.

Task 71. Consumer 40 searches 32 a specific type of image in Service 100.

Task 72. Service 100 scans for the required type in Image Attributes DB 160.

Task 73. Assuming one or more images are located, Service 100 displays (Task 75) to Consumer 40 the Thumbnails corresponding to the located images.

Task 77. Consumer 40 evaluates the Thumbnails and notifies Service 100 about her/his interest to continue the transaction. In this stage the Consumer can consult available grading information available by the Service.

Task 79. If positive, Peer-to-Peer service 100 checks if Consumer 40 is a first time Buyer, and in such case downloads (Task 81) to Consumer 40 an Image Enhancement Module 190.

Task 83. The System Control & Logic unit 150 establishes an ad-hoc peer-to-peer link 140 between Buyer 120 and the specific Image Publisher 110, who owns the located images (of Task 73). In order to do so, the System Control & Logic 150 gets the Publisher's network details from the Images & Buyers DB 160 and the Graphic Arts Buyer 120 details from the current connection data.

Task 85. The Consumer 40 retrieves, via the ad-hoc peer-to-peer link 140, a low-resolution representation of the image using the Image Enhancement Module 190 in cooperation with the Image Publishing Module (180) to get the relevant data from the Image Repository 19.

Task 87. The Consumer 40 verifies and enhances the low-res file of the image, using the tools available in Module 190, as listed above, in cooperation with Module 180. In this stage the Consumer can, for example, make certain that the specific image fulfils her/his graphic layout requirements dictated by the job at hand. Additionally the Consumer can embed the elected image/s in the job layout, to evaluate the entire page/job.

Task 89. The Consumer 40 checks the quality of the image, using tools in the Image Enhancement Module 190 as listed above, in cooperation with Module 180. In this stage the Consumer can, for example, verify that the quality of the image fulfils her/his end-product appearance requirements as dictated by the job at hand.

Task 91. If the Consumer likes the selected and verified image, the transaction is confirmed, and Task 93. The Graphic Arts Buyer 120 (of which Consumer 40 is part of) negotiates with the Image Publisher 110 the price of obtaining the (full hi-resolution) image for the planned use. The negotiation is carried out directly on the ad-hoc peer-to-peer link 140, with collaboration of the Publishing Module 180 and Billing System 170. The negotiation can include, for example, the type of use, the period of use, exclusivity to certain geographical areas or for defined market segments.

Task 95. If the Consumer does not like the selected and verified image, the transaction is aborted and the Consumer may ask the Service 100 to propose other images for examination (return to Task 71 or 73).

Task 97. Upon successful termination of the negotiation in Task 93 the Buyer 120 buys the image and pays the agreed price via the Billing System 170. In case the negotiation fails, the transaction is aborted and the Consumer 40 has the option to examine an alternative (Task 95).

Task 99. Once the purchase of the image (Task 97) is completed the high-resolution image is retrieved from the Image Publisher's Repository 19 in collaboration with the Image Publishing Module 180 and the Image Enhancement Module 190. At this stage the previous operations done by Consumer 40 on the low-resolution files of the selected image (Tasks 87) will be automatically implemented on the retrieved file, thus rendering the file ready for inclusion in the job and subsequently for print.

Figure 8:
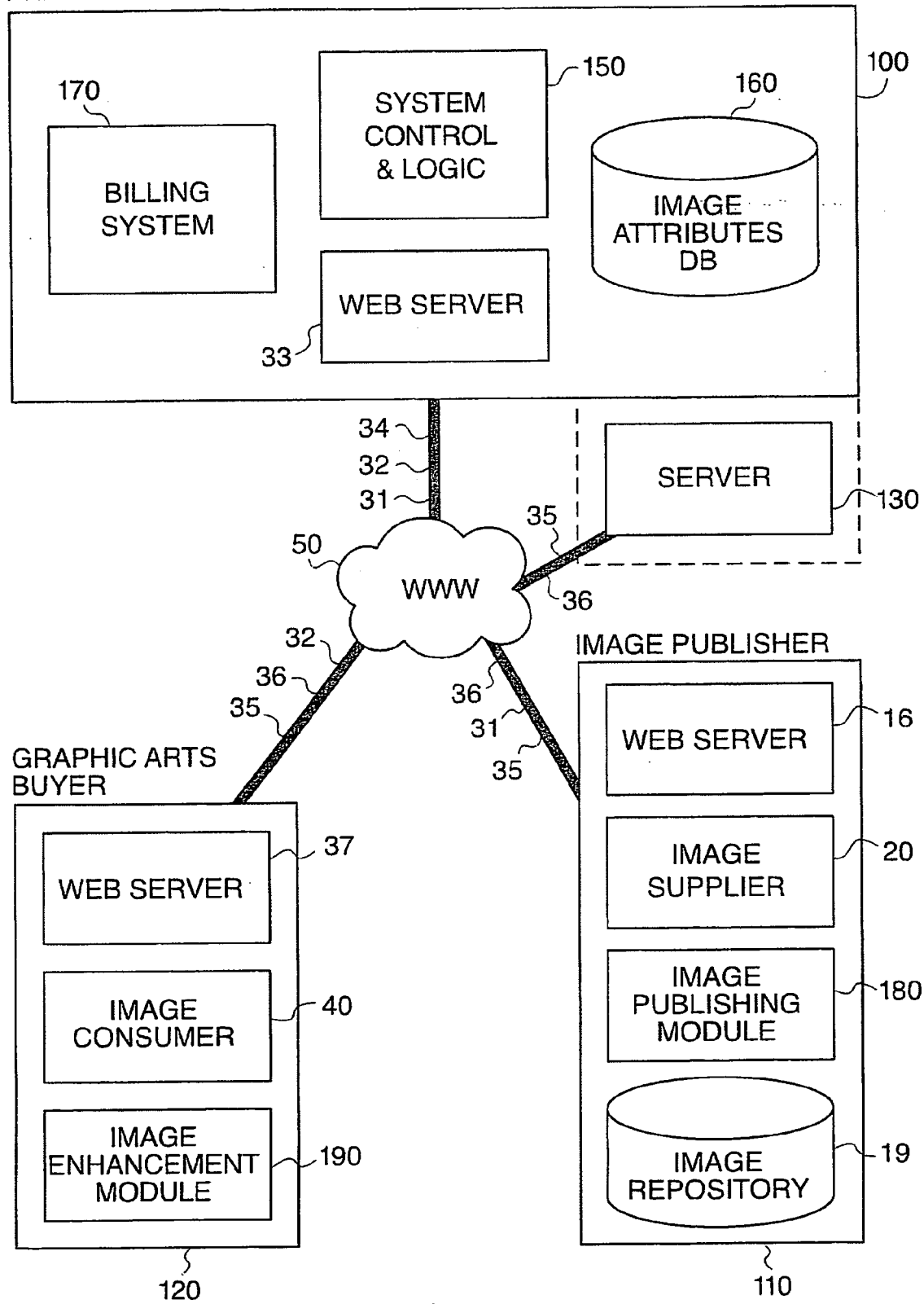
FIG. 8 is a schematic block-diagram of an alternative workflow of the Peer-to-Peer system, as described in this invention.
Figure 9A:
FIG. 9A, FIG. 9B, FIG. 9C are schematic representations of certain definitions used in this invention.
Figure 9B:
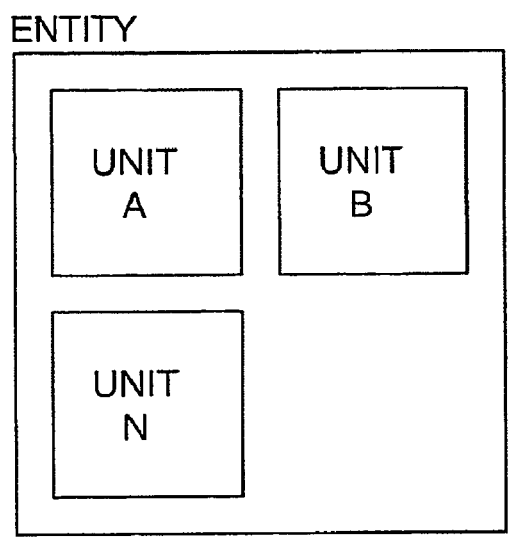
Figure 9C:

FIG. 8 is a schematic block-diagram of an alternative operational workflow of the Peer-to-Peer system, particularly useful where the direct ad-hoc peer-to-peer link 140 is impractical due to, for example, lack of adequate level of security, transmission quality or bandwidth. The alternative workflow is practical in the case Service 100 has access to a Server 130, having adequate communication security and quality with both Publishers 110 and Buyers 120.

Figure 7A:
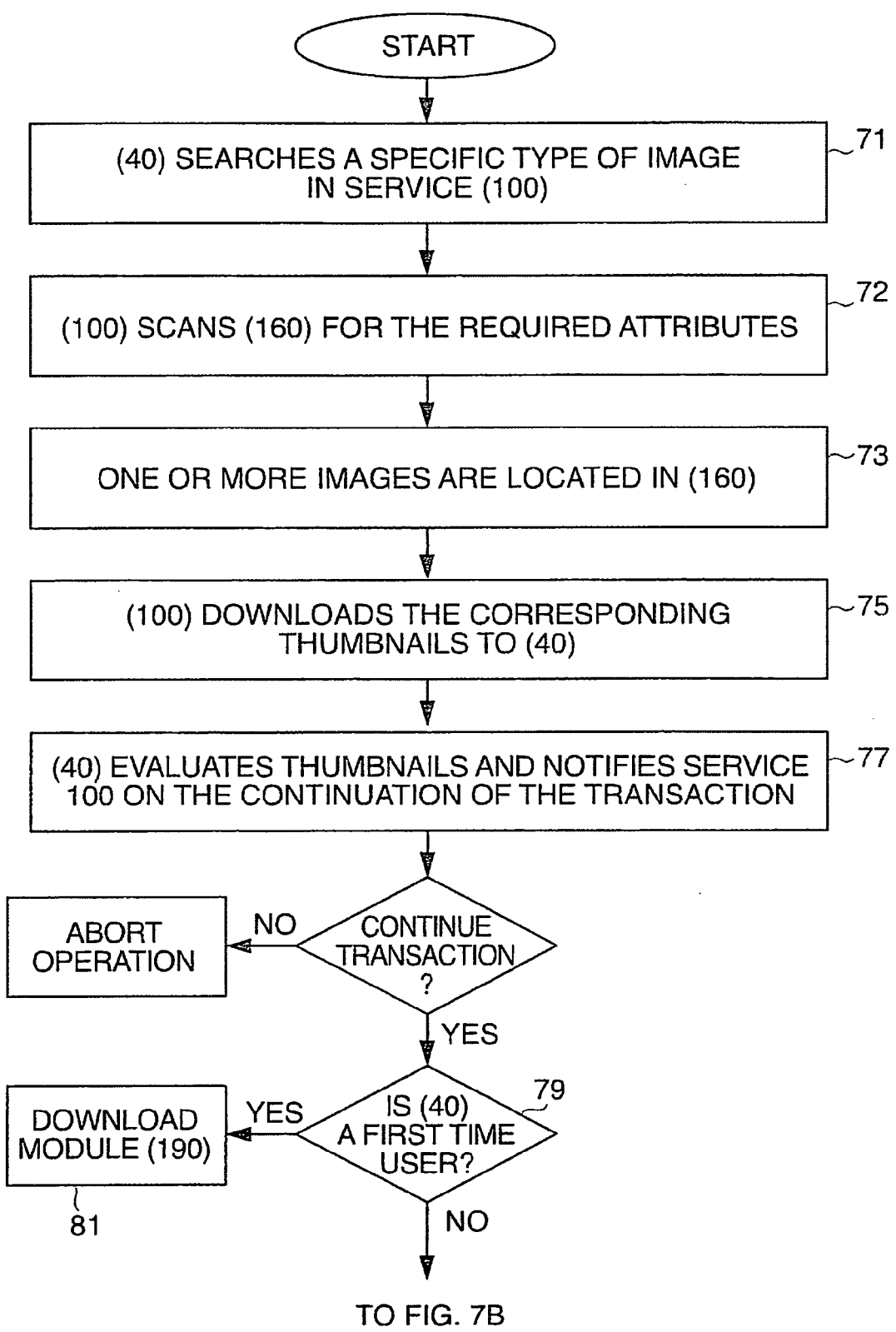
FIG. 7A and FIG. 7B are a schematic block-diagram of a typical operational workflow of the Peer-to-Peer system, as described in this invention.
Figure 7B:
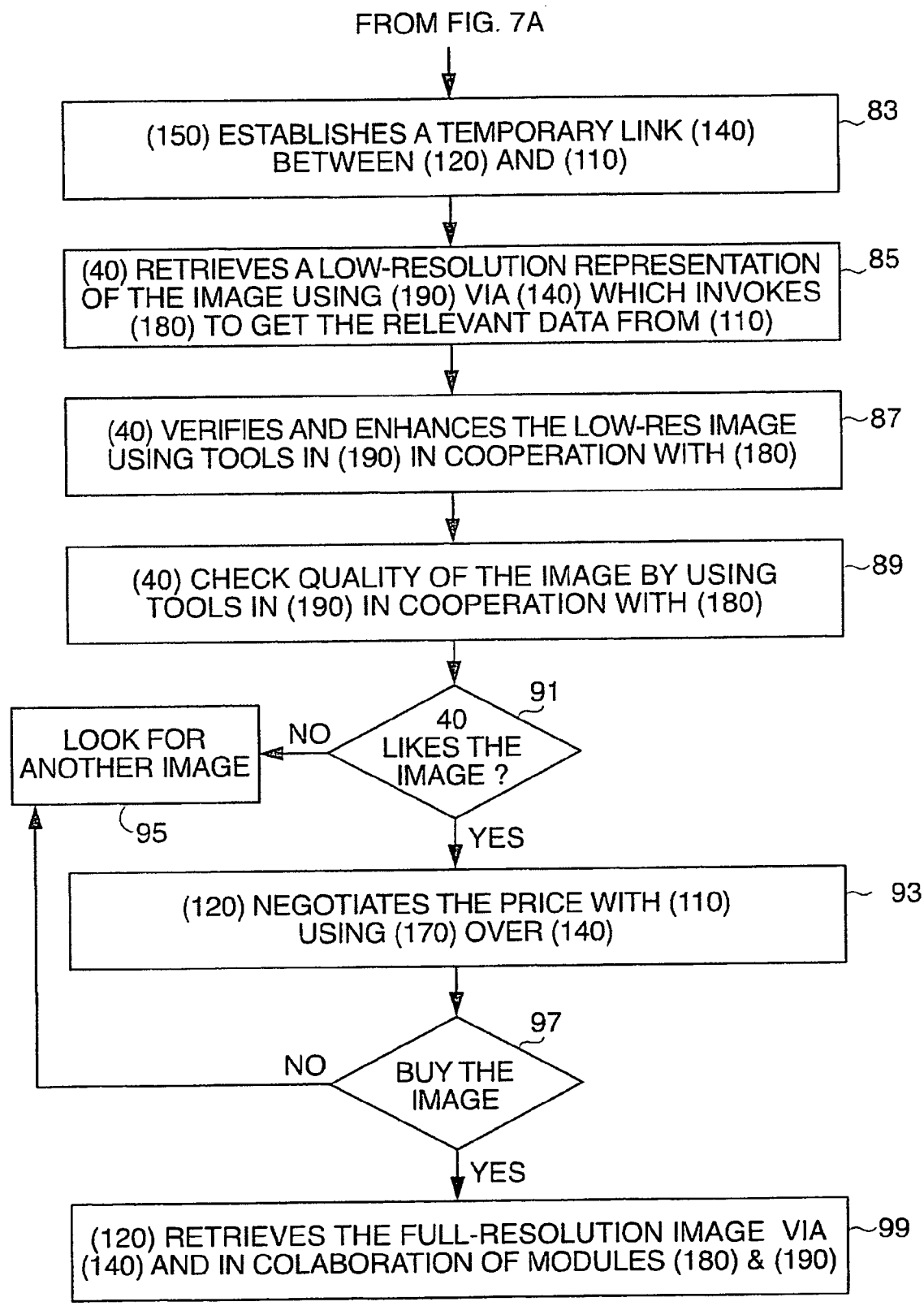

The workflow of FIG. 8 is identical to the one described for FIG. 6 FIG. 7A and FIG. 7B except that the ad-hoc peer-to-peer link 140 is replaced by a two stage network connection, namely Buyer 120 to Server 130 and Publisher 110 to Server 130. Server 130 is used for temporary storage of the low and high-resolution files transferred from Publisher 110 to Buyer 120.

A Second Preferred Embodiment

The first embodiment describes a distributed image bank, where Image Publishers (content providers) provide full size images (content) to Graphic Arts Buyers via an indexing system of the Peer-to-Peer Service-One of the innovative features in this solution is the ability of the Image Buyers to view an image in the same colors it would later be printed, provided the viewer's monitor is well calibrated for soft proofing This feature is practically an Output Simulation function.

It was further indicated in the first embodiment that a software package titled Image Enhancing Module 190 is required (at the Image Buyer's 120 computer) to perform the Output Simulation. Since the Image Buyer is using a web browser to perform the complete process of searching, purchasing and downloading an image, adding a special module just for the sake of viewing an image, is cumbersome and might discourage users to adopt such a system.

The second embodiment describes a method to perform a complete Output Simulation without adding any additional software packages to the Image Buyer.

Output Simulation is a method, which displays an image on a calibrated screen showing its color as if printed on the specified output device In the first embodiment the Output Simulation is performed by an independent software package (Image Enhancement Module 190 installed at the buyer's computer) In this embodiment it is shown that such a simulation can be performed without using any additional software to the Internet browser.

By eliminating the need to download the Image Enhancement Module 190 we gain the following:
  Image Buyers do not need to download any additional software
  There is no need for Image Buyers to learn to operate a new software tool.
  No browser compatibility issues need to be resolved
  There is no need to maintain the logistics of software updates for such a tool.

In order to perform an Output Simulation, a system should have at least 3 color profiles (for all practical purposes, a color profile is an ICC profile):
  1. Input profile, which describes the color properties of the input device, by which the image was captured
  2. Output profile, which describes the color properties of the output device, on which the image is going to be printed.
  3. Display profile, which describes the color properties of the monitor device where the simulation is taking place.

In some cases, another profile can be added to the chain, for example, a profile that is used to remove cast (color on top of neutral background) that precedes the input profile in the chain.

Figure 10:
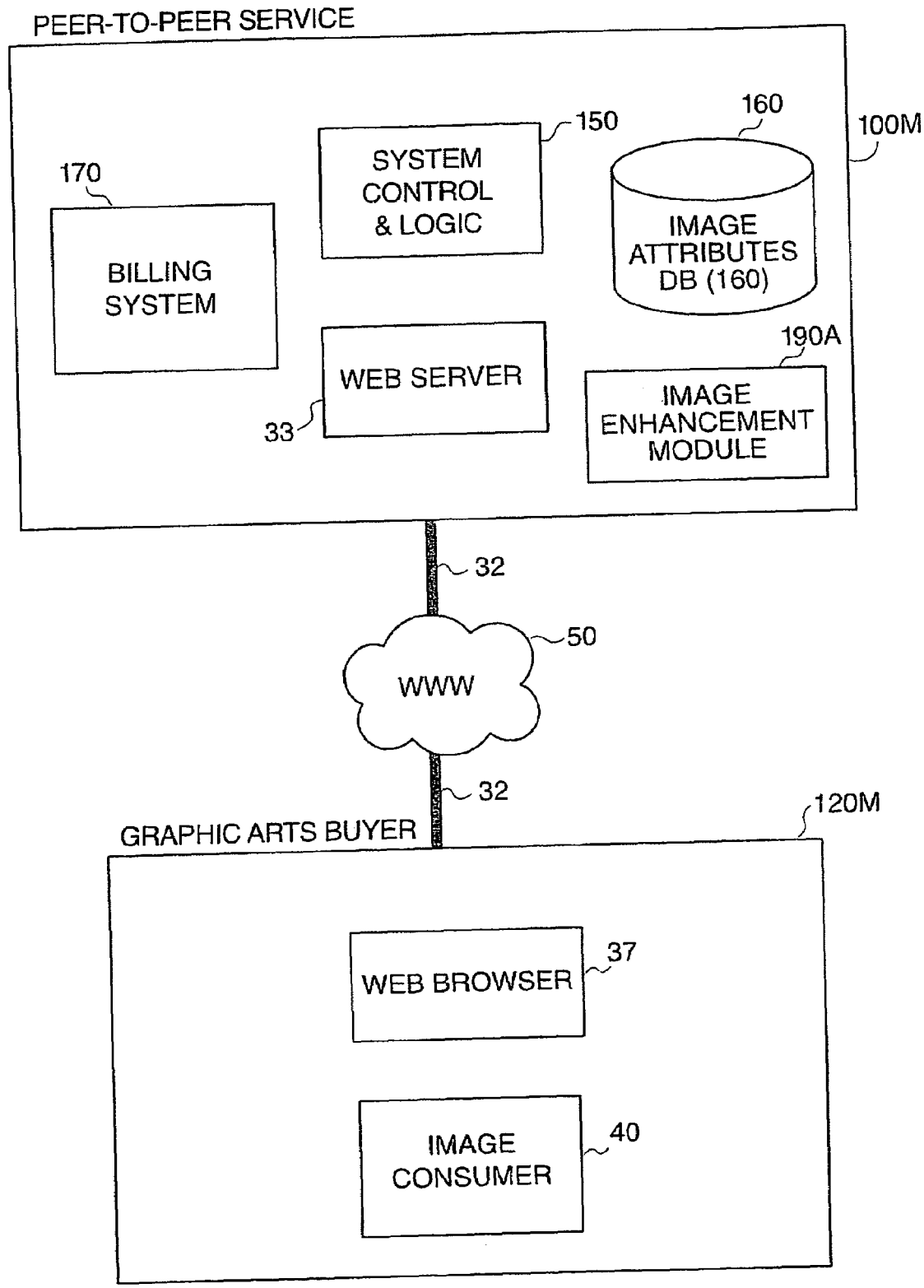
FIG. 10 is a schematic drawing of another embodiment of a typical layout and inter-unit workflow of the Peer-to-Peer Service unit and the Image Buyer of FIG. 3.
Figure 11:
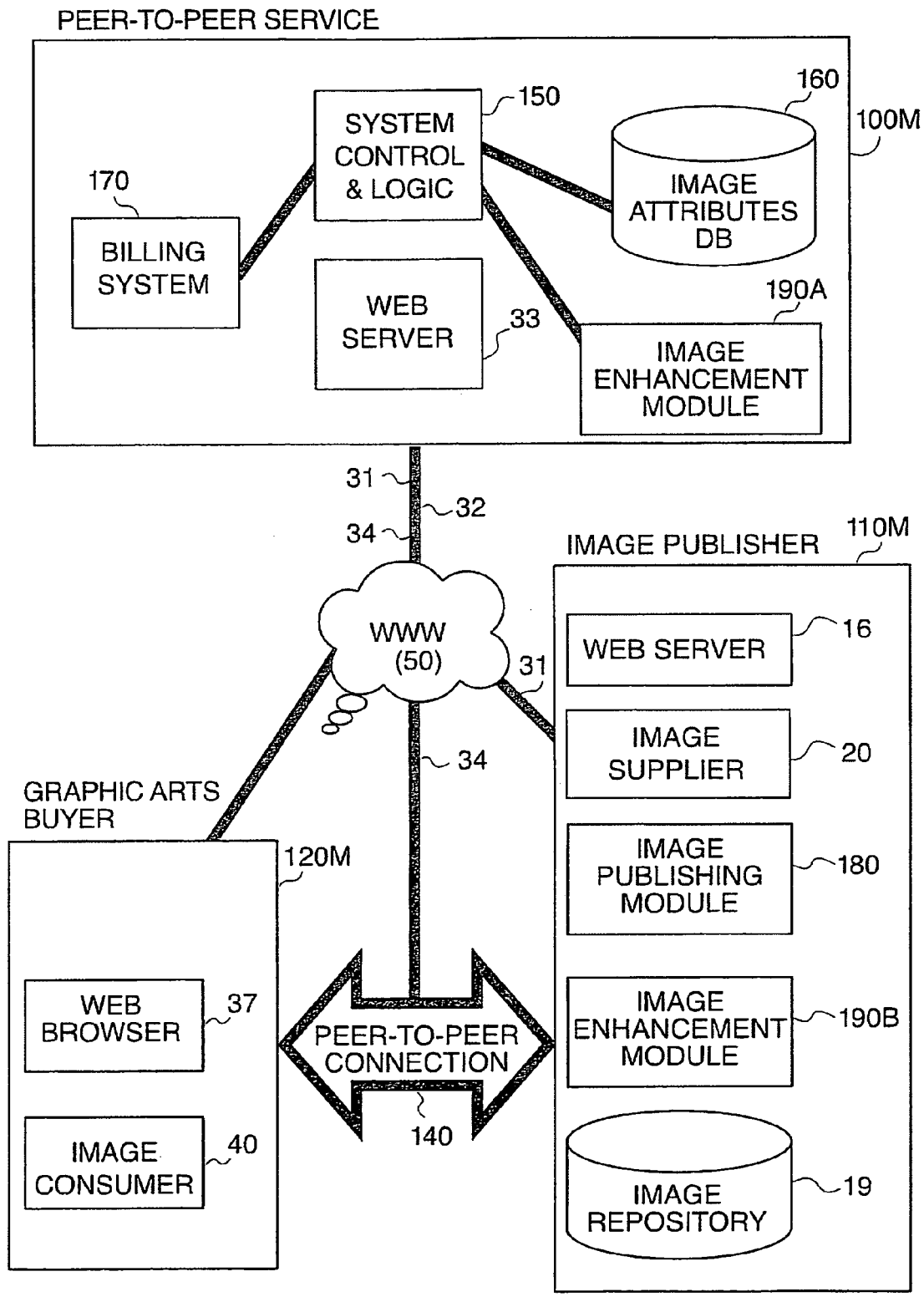
FIG. 11 is a schematic drawing of another embodiment of a typical layout and inter-unit workflow of the Peer-to-Peer Service unit, Image Publisher unit and Graphic Arts buyer unit of FIG. 6.

FIGS. 10 and 11 are relevant to the following description of the invention.

FIG. 10 represents a typical Graphic Arts Buyer 120M according to this embodiment, having only a known-in-the-art Web Browser 37 available for in-house Image Consumers 40.

In FIG. 11 an Image-Publishing Module 180 is available at the Image Publisher's site 110M. It would be ideal to assign the task of Output Simulation to this module. However, in many cases, the Buyer's Output Profile and moreover the Display Profile are not available to the Image Publisher 110M Therefore, two solutions are proposed, as further detailed.

We distinguish between two types of Output Simulation procedures:

1. A generic (or approximated) simulation, where both the Output and Display Profiles in use are of a generic type For example: for Display Profile we can use the RGB working space, and for Output Profile we can use SWOP, a generic type profile for a wide range of devices.
2. A precise simulation, where we require the Buyer's 120 specific Display Profile and the Output Profile, on which the image is going to be printed.

A Generic (Or Approximated) Simulation

Referring to FIG. 11, each Image Publisher 110M got an Image-Enhancement module 190B, including some generic profiles, as described above. This Image-Enhancement module 190B is downloaded to the Image Publisher 110M upon registration to the service 100M. As described in the first embodiment, the Image-Publishing module 180 extracts, upon request from the Buyer, a relevant partial image from the hi-resolution image stored in the computer's Image Repository 19 The actual Output Simulation will be performed in the Image-Enhancement module 190B and the image, to be subsequently viewed by the Buyer, is saved as a temporary RGB file, using RGB working space. It is then downloaded "as is" by the buyer's browser for display and evaluation.

Figure 12:
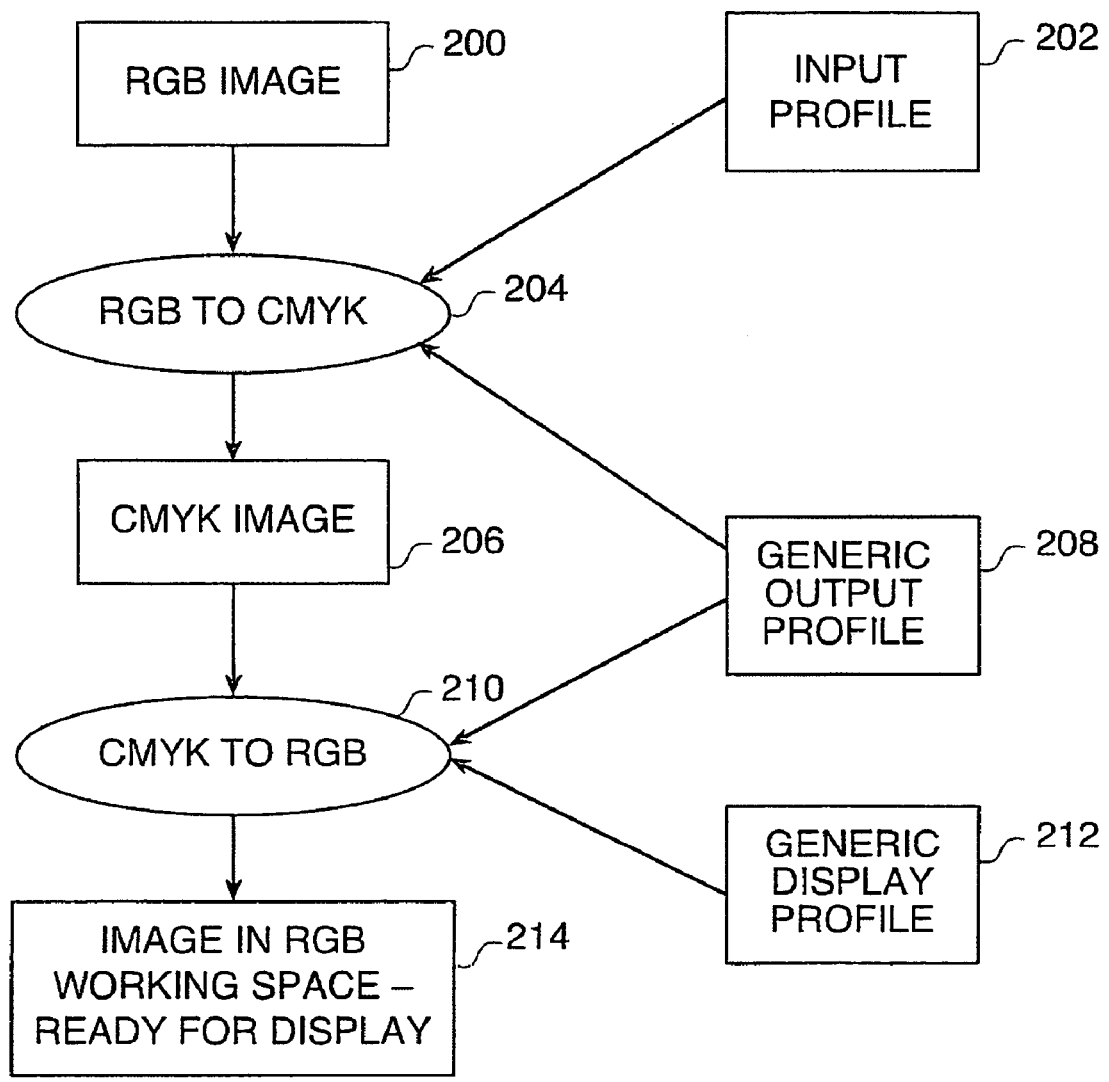
FIG. 12 is a schematic block-diagram of the Generic Simulation workflow as described in the second preferred embodiment of this invention.

The operational sequence of the simulation is illustrated in FIG. 12: A color transformation 204 of the type RGB to CMYK, as known in the art, is performed on a selected image 200, which is initially stored in RGB color space, using the input profile 202 of this image, if available (otherwise, a default RGB working space input profile is used) and a generic output profile 208. The result of this transformation is an image in CMYK color space 206. Then, another color transformation of the type CMYK to RGB 210 is performed on the temporary image in CMYK color space 206, using the generic output profile 208 and generic display profile 212 The result of this transformation is an image in RGB Working Space 214, which is ready for display.

Figure 13:
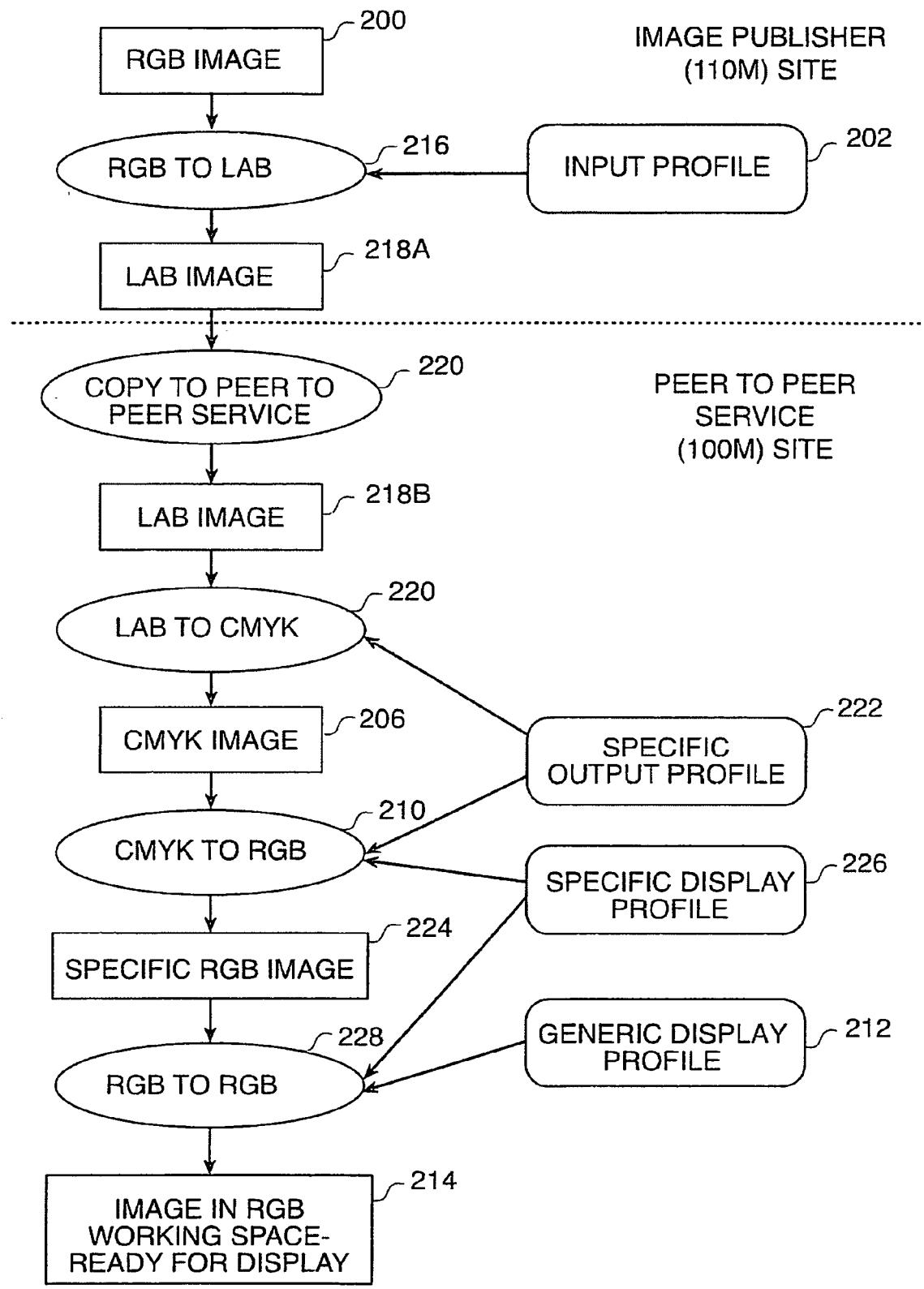
FIG. 13 is a schematic block-diagram of the Precise Simulation workflow as described in the second preferred embodiment of this invention.

Precise Simulation (FIG. 13)

Each image buyer, who wishes to have a precise simulation, will upload (at setup time or at any other time either at his/her initiative or per the system suggestion) the required profiles (display and output) to the Peer-to-Peer Service 100M. When the Output Simulation takes place, the process is divided into 2 parts:

Part 1, at the Image Publisher's site 110M (FIG. 11).
 a. The Image-Publishing module 180 extracts the relevant partial image to be displayed, as requested by the Buyer 120M, from the hi-resolution image stored in the Image Repository 19.
 b. Then, the following color sequence is performed by the Image Enhancement module 190B: A color transformation of the type RGB to Lab 216 is performed on the image, represented originally in RGB color space 200, using the input profile 202 of this image, if exists, or alternatively an RGB working space profile.
 c. The result of this transformation is an image in Lab color space 218A. Note that we may use other intermediate color space (either RGB Working Space or PCS) for this temporary image.

Part 2, at the Peer-to-Peer Service 100M, using the image enhancement module 190A. In this case, this unit has access to the relevant Buyer's output 222 and display 226 profiles that were uploaded beforehand. It then performs the rest of the Output Simulation process, where the temporary file 218A (in Lab color space) is the input of this process, and the output is an RGB file (in an RGB working space) 214:

a. First, the image in Lab color space 218A is copied from the image publisher's site 110M to the Peer-to-Peer Service 100M server, and is now notated as 218B.
 b. A color transformation of the type Lab to CMYK 220 is performed on the image 218B, using the Buyer's output profile 222. The result of this transformation is an image in CMYK color space 206.
 c. Then, a color transformation of the type CMYK to RGB 210 is performed on the image 206, using the Buyer's output profile 222 and display profile 226. The result of this transformation is an image in RGB colorspace 224.
 d. Finally, a color transformation of the type RGB to RGB 228 is performed on the image 224, using the display profile 224 and a generic RGB working space profile 212. The result of this transformation is an image in RGB working space 214, which can be down loaded by the Buyer's browser 37 for display and evaluation purposes.

It should be noted that the above precise method is one basic example of how to perform such a simulation. Another method would be to use RGB working space instead of Lab and use another profile between the input and output profiles Another Option for Output Simulation Based on the procedures explained above, a third option is available:

a. The Buyer 120M, upon his request to evaluate a specific image, is automatically offered a Generic Simulation.
 b. If there is a need for a better simulation, the Buyer uploads in real time the relevant output and display Profiles to the Image Publisher's site (110M), where,
 c. The Precise Simulation is performed in module 190B, much the same as explained in FIG. 13

Innovation and Differentiation of the Second Embodiment:

Sophisticated color matching does not require any additional software at the browser side and thus is seamless to the user.
 The Output Simulation procedure is executed in one (remote) location, or split between 2 processing units in different (remote) locations, without losing any color accuracy.
 In the Generic and Precise methods, the effective download time includes only the partial screen image (no extra time to upload or download any special color profiles).
 There is no need to perform any sophisticated color calibration to achieve a good simulation.
 During the setup procedure, there is an option to define more parameters, which characterize the Buyer's preferences, e.g. saturation of skin tone.
 The system support is easier and cheaper, since no software updates are required at the Buyers side (and these are most of the customers served by the Service 100M).

A Third Preferred Embodiment—Exclusive Content Provider—Useful for the First and Second Embodiments Each Image Publisher 110 can choose to become an Exclusive Content Provider (ECP) within the peer-to-peer service 100. By doing so, the Image Publisher achieves the following:
 1. Maintains the brand identity of her/his offering.
 2. Limits image buyers to search only within her/his offering.

3. Has ability to segregate users according to levels of permission.

In addition, an Image Publisher can use the Peer-to-Peer Service as a back-end for her/his own website.

DETAILED DESCRIPTION

Brand identity. For each domain of an ECP, we define a sub-portal within the Peer-to-Peer Service 100. This sub-portal contains the following components:

The Company's specially designed banner
The Company's profile
The Company's portfolio and a copyright statement
An option to rearrange the entire look & feel of this sub-portal Closed set: In order to create a closed set of images within the Peer-to-Peer Service 100, we attach each image with an attribute—"My Image Publisher". When an Image Buyer 120 chooses to enter into the gallery of an ECP, the search attribute of "My Image Publisher" is assigned with a constant value, which matches the specific Image Publisher. Only when the Image Buyer explicitly chooses to exit this mode, the constant search attribute is reset Different permission scheme: In order to create a "permission scheme", each Image Publisher is assigned with a list of Image Buyers, each with a different permission scheme for the content offered by the Image Publisher. For every operation on this content (e.g. download) the current user profile is matched against the above list so that only a user with the appropriate permission can perform the operation.

Independent website; The Peer-to-Peer Service 100 is exporting a web API called Web Services. Almost every operation performed by the Peer-to-Peer Service can be called from a different web application on the following terms:

1. The web application uses the public IP port 80.
2. It has permission to perform this specific operation (in some cases we use secured protocol such as SSL)

Figure 14:
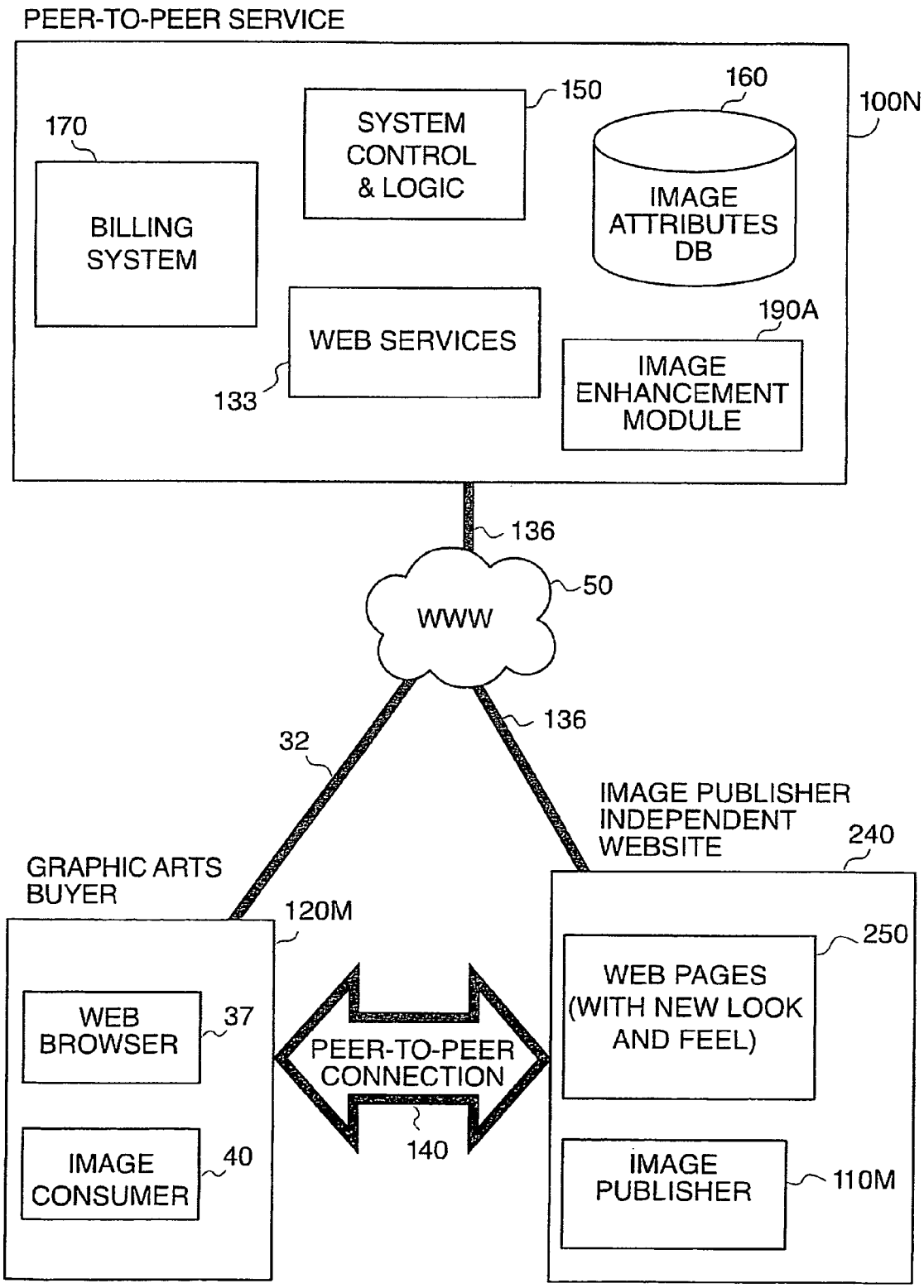
FIG. 14 is a schematic block-diagram of the operation via Web Services as described in the third preferred embodiment of this invention.

An example of an operation via Web Services 133 is illustrated in FIG. 14 as applied to the second embodiment. The Graphic Arts Buyer 120M browses the Image Publisher Independent Website 240 Image Publisher 110M is an integral part of Image Publisher Independent Website 240. The Web pages 250, part of Website 240, have a particular "look & feel" and include a suitable search page. When a search command (with search parameters) is sent to the Image Publisher 110M, the later, simply, forwards 136 it to the Web Services 133 unit in the Peer-to-Peer Service 100N, and gets 136 via Web Services 133 the search results page back.

Innovation and Differentiation
1. Other Image Portals, such as Alamy from the UK, provide tools to view content of a specific Image Publisher. However, their tool is simply a filtered search results page, and does not provide an explicit brand differentiation or offer permission level management.
2. None of the current stock images services in the industry provide tools enabling a back-end operation for another website, namely, the Image Publisher's Independent Website 240.

The alternative operational workflow of the Peer-to-Peer system of FIG. 8, which is particularly useful where the direct ad-hoc peer-to-peer link 140 is impractical, can be used both for the second and third preferred embodiments of this invention.

The technologies and methods described in the preferred modes of this invention are known in the art of Graphic arts, Pre-Press and data communication over the Internet. Wherever specific technologies were employed, examples for such technologies were quoted.

What is claimed is:

1. A method of locating and purchasing high-resolution images by a buyer directly from a publisher of said images, the method comprising:
   a) accessing a system service unit through a network connection;
   b) searching attributes of said high-resolution images in said system service's data base and selecting desired thumbnails;
   c) simulating, enhancing and verifying a quality of the high-resolution images and their low-resolution representation corresponding to said selected thumbnail by controlled remote accessing of an image publisher unit via a network connection;
   d) purchasing from said system service unit and paying for a permission to download said selected high-resolution images;
   e) acquiring from said image unit, said selected image in high-resolution format directly to said image buyer terminal; and
   f) automatically rendering said selected image in high-resolution format ready for print by applying parameters of step (c).

2. The method of claim 1, wherein said simulating, enhancing and verifying step comprises at least one of:
   a) evaluating the low-resolution representation of a selected thumbnail;
   b) cropping and scaling said low-resolution representation;
   c) enhancing said low-resolution representation including at least one of toning, sharpening, color correction and color conversion;
   d) embedding the selected and enhanced low-resolution image in a page layout;
   e) obtaining from said high-resolution image a defined partial image in maximum resolution, and
   f) simulating said partial image on said image buyer terminal calibrated screen.

3. The method of claim 2, wherein said simulation on said image buyer terminal calibrated screen is one of generic simulation or precise simulation.

4. The method of claim 1, wherein said purchasing step comprises at least one of
   a) negotiating a price, of the high-resolution image by said image buyer, by accessing said image publisher's price negotiating module;
   b) paying the negotiated price; and
   c) combinations thereof.

5. The method of claim 4, wherein said paying to is at least to one of said image
   publisher, the service unit, or split between eligible parties.

6. The method of claim 1, wherein said acquiring comprises at least one of:
   a) downloading said selected high-resolution image via said network connection;
   b) receiving a removable storage device including said selected high-resolution image, and
   c) receiving a transparency representing said selected high-resolution image.

7. The method of claim 1, wherein said steps (c), (e) and (f) are carried out indirectly via a temporary storage location in said system service.

8. A method of embedding images, selected from an image-bank or a peer-to-peer networked service, in an image buyer's page layout, the method including:
   a) selecting at least one thumbnail available from said service to be embedded in said layout;
   b) obtaining the low-resolution image, corresponding to said at least one selected thumbnail;
   c) fitting said low-resolution image in said image buyer's page layout;
   d) enhancing said low-resolution image, including at least one of toning, sharpening, color correction and color conversion;
   e) obtaining from the high-resolution image, corresponding to said low resolution image, a defined partial image in maximum resolution;
   f) simulating said partial image on said image buyer's terminal calibrated screen, wherein said simulation is one of generic simulation or precise simulation;
   g) closing said page layout including the enhanced low-resolution representation and simulation of the image;
   h) purchasing said high-resolution image from said image-bank or peer-to-peer service;
   i) acquiring said high-resolution image from an image publisher's repository to the image buyer's terminal; and
   j) automatically embedding and enhancing said high-resolution images in said layout.

9. The method of claim 8, wherein said purchasing includes at least one of:
   a) negotiating a price, of said high-resolution image, by accessing said publisher's price negotiating unit, and
   b) paying the negotiated price.

10. The method of claim 9, wherein said paying to is at least to one of said image publishers, the service system, or split between eligible parties.

11. The method of claim 8, wherein said acquiring comprises at least one of:
   a) downloading said selected high-resolution image via said network service
   b) receiving a removable storage device including said selected high-resolution image file, and
   receiving a transparency representing said selected high-resolution image.

* * * * *